United States Patent
Molina et al.

(10) Patent No.: US 6,281,393 B1
(45) Date of Patent: Aug. 28, 2001

(54) POLYOLS USEFUL FOR PREPARING WATER BLOWN RIGID POLYURETHANE FOAM

(75) Inventors: Nelson F. Molina, Pearland; Stanley E. Moore, Lake Jackson, both of TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/389,699

(22) Filed: Sep. 3, 1999

Related U.S. Application Data

(60) Provisional application No. 60/099,714, filed on Sep. 10, 1998.

(51) Int. Cl.$^7$ .................................................. C07C 43/11
(52) U.S. Cl. .................... 568/607; 544/401; 564/336; 564/343; 564/344; 564/349; 568/583; 568/584; 568/608
(58) Field of Search ............................. 544/401; 564/336, 564/343, 344, 349; 568/583, 584, 607, 608

(56) References Cited

U.S. PATENT DOCUMENTS

| | | |
|---|---|---|
| 4,119,584 | 10/1978 | Papa et al. . |
| 4,381,353 | 4/1983 | McDaniel . |
| 4,383,102 | 5/1983 | McDaniel et al. . |
| 4,397,966 | 8/1983 | Stolz et al. . |
| 4,404,121 | 9/1983 | Klein et al. ........................ 252/426 |
| 4,485,195 | 11/1984 | Brennan et al. . |
| 4,487,852 | 12/1984 | Brennan et al. . |
| 4,489,178 | 12/1984 | Brennan et al. . |
| 4,500,655 | 2/1985 | Brennan . |
| 4,579,876 | 4/1986 | Iliopulos . |
| 4,654,376 | 3/1987 | Brennan et al. ..................... 521/167 |
| 4,883,826 | 11/1989 | Marugg et al. . |
| 4,891,395 * | 1/1990 | Gastinger et al. .................... 528/73 |
| 4,939,182 | 7/1990 | Marugg et al. . |
| 4,945,119 | 7/1990 | Smits et al. . |
| 4,972,003 | 11/1990 | Grunbauer et al. . |
| 4,996,242 | 2/1991 | Lin . |
| 4,997,706 | 3/1991 | Smits et al. . |
| 5,001,164 | 3/1991 | Smits et al. . |
| 5,010,116 | 4/1991 | Colafati . |
| 5,091,434 | 2/1992 | Suzuki et al. . |
| 5,093,377 | 3/1992 | Bartlett et al. . |
| 5,114,986 | 5/1992 | Lin . |
| 5,120,815 * | 6/1992 | Marugg et al. ......................... 528/73 |
| 5,143,945 | 9/1992 | Bodnar et al. . |
| 5,164,419 | 11/1992 | Bartlett et al. . |
| 5,286,759 | 2/1994 | Smits et al. . |
| 5,387,618 | 2/1995 | Smits . |
| 5,391,317 | 2/1995 | Smits . |
| 5,407,967 | 4/1995 | Williams et al. . |
| 5,451,615 | 9/1995 | Birch . |
| 5,464,561 | 11/1995 | Williams et al. . |
| 5,496,869 | 3/1996 | Williams et al. . |
| 5,621,051 | 4/1997 | Kutani et al. . |
| 5,627,220 | 5/1997 | Matsumoto et al. . |
| 5,627,221 | 5/1997 | Schumacher et al. . |
| 5,872,156 | 2/1999 | Inazawa et al. . |
| 5,874,021 | 2/1999 | Inazawa et al. . |

FOREIGN PATENT DOCUMENTS

| | | |
|---|---|---|
| 23 64 861 | 7/1975 | (DE) . |
| 0 398 147 A2 A3 | 11/1990 | (EP) . |

OTHER PUBLICATIONS

Chemical Abstracts, vol. 117, No. 26, Dec. 1992.
Papa, et al., "Hybrid Phenolic/Urethane Foams," Journal of Cellular Plastics, Sep./Oct., 1979.

* cited by examiner

*Primary Examiner*—John M. Cooney, Jr.

(57) ABSTRACT

Mannich polyols having a viscosity of from 300 to 3,500 cps (0.3 to 3.5 Pa*s) at 25° C. are prepared by admixing a phenol, an alkanolamines, and formaldehyde mixed in molar ratios of from 1:1:1 to 1:2.2:2.2 resulting in an initiator which can be alkoxylated using a mixture of ethylene oxide and propylene oxide to prepare polyols that have a nominal functionality of from 3 to 5.4.

14 Claims, No Drawings

POLYOLS USEFUL FOR PREPARING WATER BLOWN RIGID POLYURETHANE FOAM

CROSS REFERENCE

This application claims the benefit of U.S. Provisional Application No. 60/099,714, filed on Sep. 10, 1998.

BACKGROUND OF THE INVENTION

This invention relates to polyols useful for preparing water blown polyurethane foams. This invention particularly relates to Mannich polyols useful for preparing water blown polyurethane foams.

It has long been known to prepare rigid polyurethane foams by the reaction of a polyisocyanate with a hydroxyl-terminated polyester or poly(oxyalkylene)ether having a hydroxyl number within the range of from about 350 to about 900. One group of polyols useful for preparing such foams includes the nitrogen-containing polyols described in U.S. Pat. Nos. 3,297,597, 4,137,265, and 4,383,102 ('102). The nitrogen containing polyols which are prepared by alkoxylation of the reaction product of a phenol, alkanolamines and formaldehyde, such as those disclosed in '102 above, shall be hereinafter referred to as Mannich polyols. It has been reported in the literature that polyurethane foam prepared from these polyols is characterized by a greater inherent fire retardancy and good dimensional strength when extraneous fire retardants are employed.

One area of use for such polyols has been in spray foams systems used in roof and pipe insulation applications. The equipment normally used for the industrial application of sprayed urethane foam uses "double acting" positive displacement pumps which have the advantage of supplying an accurate component ratio in a continuous stream. A major disadvantage of this metering system is that it will function reliably only if the B-component has a viscosity of less than 1,000 centipoise at ambient temperature. At higher viscosities, cavitation can occur on the B-component side, resulting in a component ratio change which can affect the foam product quality.

Typically, in the past, the formulations used to prepare spray systems have included halocarbon blowing agents. In the present, the use of many of the traditional blowing agents have been discontinued, or phased out, because of the belief that they contribute to the destruction of the ozone layer which limits the amount of ultraviolet radiation which penetrates the atmosphere. This has resulted in a search for alternative blowing agents such as water.

While water is a useful blowing agent in many types of polyurethane foam, it does not have all of the properties of the halocarbon blowing agents which it has replaced. For example, one disadvantage of water as a blowing agent in polyol formulations including Mannich polyols is water does not reduce the viscosity of Mannich polyols as effectively as halocarbon blowing agents. As stated above, attempting to make foams with formulations which are too high in viscosity can cause problems with some kinds of foam making equipment. Therefore, it would be desirable in the art of preparing water blown polyurethane foams from formulations including Mannich polyols to use an ultra low viscosity Mannich polyol of sufficiently low viscosity to avoid handling problems such as cavitation problems with foam forming equipment.

SUMMARY OF THE INVENTION

In one aspect, the present invention is a process for preparing a Mannich polyol having a viscosity of from 300 to 3,500 cps (0.3 to 3.5 Pa*s) at 25° C. comprising the steps of admixing a phenol, an alkanolamine, and formaldehyde to prepare a Mannich base and then alkoxylating the mannich base with an admixture of ethylene oxide and propylene oxide under reaction conditions sufficient to prepare a Mannich polyol.

In another aspect, the present invention is a Mannich polyol having a viscosity of from 300 to 3,500 cps (0.3 to 3.5 Pa*s) at 25° C.

In still another aspect, the present invention is a polyurethane foam formulation comprising a polyisocyanate A side and a B side including a Mannich polyol having a viscosity of from 300 to 3,500 cps (0.3 to 3.5 Pa*s) at 25° C.

In another aspect, the present invention is a polyurethane foam comprising a polyurethane foam prepared with a polyurethane foam formulation including a polyisocyanate A side and a B side including a Mannich polyol having a viscosity of from 300 to 3,500 cps (0.3 to 3.5 Pa*s) at 25° C.

DESCRIPTION OF THE PREFERRED EMBODIMENTS

One embodiment of the present invention is an ultra low viscosity Mannich polyol having a viscosity of from 300 to 3,500 cps (0.3 to 3.5 Pa*s) at 25° C. The Mannich polyols of the present invention are prepared by admixing a phenol, an alkanolamines, and a formaldehyde mixed in molar ratios resulting in an initiator which can be alkoxylated to prepare polyols that have a nominal functionality of from 3 to about 5.5. For purposes of the present invention, the nominal functionality of polyols of the present invention is equal to the theoretical functionality of the initiator. For example, if unsubstituted phenol and diethanolamine are used with formaldehyde to prepare a Mannich initiator of the present invention in a molar ratio of 1:3:3, the nominal functionality of the resulting polyol is 7 because there are three sites on phenol for formaldehyde to bond and each of those sites is subject to bonding with diethanolamine which is itself di-hydroxy functional. Therefore, such a polyol is 7 functional because each of the 3 diethanolamine results in 2 OH groups and the sum of those 6 OH groups and the original phenolic OH group equals 7.

The Mannich initiators of the present invention are alkoxylated using a mixture of ethylene oxide and propylene oxide. Using a mixture of ethylene oxide and propylene oxide to alkoxylate these initiators allows for the production of a Mannich polyol with comparatively very low viscosities (hereinafter ultralow viscosity Mannich polyols). The ultra low viscosity Mannich polyols of the present invention preferably have a viscosity of from 300 to 1500 cps (0.3 to 1.5 Pa*s), and more preferably have a viscosity of from 300 to 1000 cps (0.3 to 1.0 Pa*s).

Care should be used when preparing the Mannich polyol initiators of the present invention to use the appropriate molar ratios of the phenols, alkanolamines, and formaldehyde to achieve the desired nominal functionality. The preferred ratio of phenol and formaldehyde for preparing the Mannich polyols of the present invention is from 1:1 to 1:2.2. More preferably the ratio of phenol to formaldehyde is from 1:1.5 to 1:2.

The preferred molar ratio of formaldehyde to alkanolamine for use with the processes of the present invention is 1:1. Additional quantities of alkanolamines can be used in preparing the initiators of the present invention, but are neither required nor usually desirable. Use of additional alkanolamines promotes the formation of polyols resulting from the alkoxylation of the alkanolamine. For example, wherein the alkanolamine is diethanolamine and it is used in excess of the molar ratios specified above and not removed prior to alkoxylation, it can be alkoxylated to form a triol. The presence of such amine initiated polyols can result in lower viscosities of the resulting polyol mixtures, but can also lower average functionality which is sometimes undesirable. Use of less than a 1:1 molar ratio of alkanolamine to formaldehyde can also result in Mannich polyol initiators having higher nominal functionalities. Preferably, the Mannich polyol initiators of the present invention are prepared using a molar ratio of phenol to alkanolamine to formaldehyde of from 1:1:1 to 1:2.2:2.2, more preferably from 1:1.5:1.5 to 1:2:2, and most preferably 1:2:2.

Phenols which can be used to prepare the present invention include: o-, m-, or p-cresols, ethylphenol, nonylphenol, p-phenylphenol, 2,2-bis(4-hydroxyphenol) propane, beta-naphthol, beta -hydroxyanthracene, p-chlorophenol, o-bromophenol, 2,6-dichlorophenol, p-nitrophenol, 4-nitro-6-phenylphenol, 2-nitro-4-methylphenol, 3,5-dimethylphenol, p-isopropylphenol, 2-bromo-4-cyclohexylphenol, 4-t-butylphenol, 2-methyl-4-bromophenol, 2-(2-hydroxypropyl)phenol, 2-(4-hydroxyphenol) ethanol, 2-carbethoxyphenol, 4-chloromethylphenol and mixtures thereof. It is especially preferred that the phenols used to prepare the Mannich polyols of the present invention be unsubstituted phenol or a phenol having a single hydrophilic substituent. It is most preferred that the phenol be unsubstituted phenol.

The alkanolamine to be reacted with the phenolic compound and formaldehyde in accordance with the present invention is an alkanolamine selected from the group consisting of mono- and di-alkanolamines and ammonia. Examples of suitable alkanolamines that may be used are monoethanolamine, diethanolamine, isopropanolamine, diisopropanolamine, bis(2-hydroxypropyl)amine, hydroxyethyl-methylamine, N-hydroxy-ethylpiperazine, N-hydroxybutylamine, N-hydroxyethyl-2,5-dimethlpiperazine, and mixtures thereof. It is especially preferred that the amine used be diethanolamine. It is also anticipated that ammonia, $NH_3$, could be used in the place of the alkanolamine and still be within the scope of this invention. Mixtures of alkanolamines can also be used to prepare the ultralow viscosity polyols of the present invention.

The Mannich polyols of the present invention are prepared by admixing an amine, phenol and formaldehyde under reaction conditions sufficient to prepare an active hydrogen containing material known as a Mannich initiator (or Mannich base), and then alkoxylating the Mannich initiator. Any reaction conditions sufficient to prepare the initiator and known to one of ordinary skill in the art of preparing aromatic amine polyols can be used. For example, the general process of '102 wherein: (1) first, phenol and amine and then formaldehyde are admixed; (2) and then heated at from 50° C. to 150° C. for a period of time sufficient to reduce the formaldehyde concentration to less than 1 weight percent; (3) and the resultant solution is stripped of water; and (4) the water stripped initiator is alkoxylated at from 30° C. to 200° C., can be used with the present invention.

Water is stripped from the Mannich initiator prior to alkoxylation in a preferred embodiment of the present invention. Preferably, water is stripped from the initiator until it is present in a range of from about 0.5 to 1.5 percent by weight in the Mannich base prior to alkoxylation. Like excess alkanolamines, water too can react with alkylene oxides to form polyols except that in the case of water, the resulting polyol is a diol. The presence of too much diol in the polyols of the present invention can lower average functionality which is sometime undesirable.

The Mannich polyols of the present invention are prepared by alkoxylating a Mannich initiator. Minor amounts of any alkylene oxide can be used to prepare the Mannich polyols of the present invention, but at least 50 weight percent of the alkylene oxides used are ethylene oxide and propylene oxide. Of the combined weight of ethylene oxide and propylene oxide used to prepare the Mannich polyols of the present invention, from 5 to 55 percent is ethylene oxide either in the form of a mixed feed or added as a block addition after completion of other alkoxylation reactions. Preferably, of the combined weight of ethylene oxide and propylene oxide used to prepare the Mannich polyols of the present invention, from about 10 to about 45, more preferable from about 15 to about 30, and most preferable about 20 percent of the alkylene oxide is ethylene oxide.

Besides the method of addition described above, the ultralow viscosity Mannich polyols of the present invention can be prepared using any method known to be useful to those skilled in the art of preparing polyols. It is preferred, however, that the first method outlined above be used. This preferred method mixes the phenol and alkanolamine first and then adds the formaldehyde before the alkylene oxide addition. Care should be taken that phenol and formaldehyde are not admixed under conditions which could lead to the formation of undesirable byproducts, unless such a result is desired.

In preparing the Mannich polyols of the present invention, the minimum desirable amount of alkylene oxide used is about 0.3 moles per hydroxyl group in the Mannich base. The maximum desirable amount of alkylene oxide is about 3.5 moles per hydroxyl group. In general, phenolic hydroxyl groups form unstable urethane linkages and so are to be avoided where practical. Since phenolic hydroxyl groups are reactive, the phenolic hydroxyl groups will react with the alkylene oxide, thereby assuring reaction of the phenolic hydroxyl groups when the stoichiometric amount of alkylene oxide is used.

The ultralow viscosity Mannich polyols of the present invention have OH numbers (also known as hydroxyl numbers) of from about 250 to about 500. The OH number of a polyol of known equivalent weight can be calculated by dividing 56,100 by the equivalent weight of the polyol with the product being the OH number. It can be difficult to prepare Mannich polyols of the present invention with OH numbers of less than about 350 without using a catalyst to supplement the autocatalytic properties of the Mannich bases. Polyols of the present invention having OH numbers of from 250 to 350 can be prepared using supplemental catalysts such as trimethyl amine, potassium hydroxide, and the like. When such supplemental catalysts are used, care should be taken to remove or neutralize the supplemental catalysts if the intended use of the polyol is one wherein the presence of the catalyst would be undesirable. The ultralow viscosity polyols of the present invention preferable have an OH number of from about 280 to about 450. Most preferable, the polyols of the present invention have an OH number of from about 300 to 400.

Conventional Mannich polyols have viscosities of greater than 3500 cps (3.5 PA·s) at 25° C. For example, VORANOL 470X* has a viscosity of 7,000 to about 13,000 cps (7–13 PA·s)@25° C. (*VORANOL 470X is a trade designation of The Dow Chemical Company). Use of conventional Mannich polyols in a water blown system can cause equipment failure and other processing difficulties. In addition, when made, foams prepared using conventional Mannich polyols and water as a blowing agent can have coarse cell structure and be subject to delamination. The ultra low viscosities of the Mannich polyols of the present invention allow for their use with water blown systems in formulations which present minimal processing difficulties.

While polyurethane foam formulations which include water as the only blowing agent are preferred embodiments of the present invention, it is contemplated that the present invention includes formulations having mixed blowing agents as well. For example, both water and one or more of the following materials could be used as blowing agents for the formulations of the present invention: hydrocarbons, chlorinated hydrocarbons, fluorinated hydrocarbons generally. Preferably the blowing agent used with water for formulations of the present invention is HCFC-141b, HCFC-22, HFC-134a, n-pentane, isopentane, cyclopentane, HCFC-124 and HFC-245.

Water is the preferred blowing agent for formulations of the present invention. In formulations useful for preparing the polyurethane foams of the present invention, water will be present at a concentration of from about 0.5 to about 25 parts per hundred parts of polyol. Preferably water is present at a concentration of from 3 to about 20 parts per hundred parts of polyol. Even more preferably water is present at a concentration of from 4 to about 10 parts per hundred parts of polyol.

The polyurethane foams of the present invention are prepared by admixing a polyisocyanate "A" side with a "B" side including a Mannich polyol of the present invention. The polyisocyanate component of the formulations of the present invention can be advantageously selected from organic polyisocyanates, modified polyisocyanates, isocyanate-based prepolymers, and mixtures thereof. These can include aliphatic and cycloaliphatic isocyanates, but aromatic and especially multifunctional aromatic isocyanates are preferred, and polyphenyl polymethylene polyisocyanates (PMDI) is most preferred.

Other polyisocyanates useful with the present invention include 2,4- and 2,6-toluenediisocyanate and the corresponding isomeric mixtures; 4,4'-, 2,4'- and 2,2'-diphenylmethanediisocyanate and the corresponding isomeric mixtures; mixtures of 4,4'-, 2,4'- and 2,2'-diphenylmethanediisocyanates and polyphenyl polymethylene polyisocyanates PMDI; and mixtures of PMDI and toluene diisocyanates. Also useful for preparing the polyurethanes of the present invention are aliphatic and cycloaliphatic isocyanate compounds such as 1,6-hexamethylene-diisocyanate; 1-isocyanato-3,5,5-trimethyl-1-3-isocyanatomethyl-cyclohexane; 2,4- and 2,6-hexahydrotoluene-diisocyanate, as well as the corresponding isomeric mixtures; 4,4'-, 2,2'- and 2,4'-dicyclohexylmethanediisocyanate, as well as the corresponding isomeric mixtures. 1,3 Tetramethylene xylene diisocyanate can also be used with the present invention.

Also advantageously used for the polyisocyanate component of the formulations of the present invention are the so-called modified multifunctional isocyanates, i.e., products which are obtained through chemical reactions of the above diisocyanates and/or polyisocyanates. Exemplary are polyisocyanates containing esters, ureas, biurets, allophanates and preferably carbodiimides and/or uretonimines; isocyanurate and/or urethane group containing diisocyanates or polyisocyanates. Liquid polyisocyanates containing carbodiimide groups, uretonimine groups and/or isocyanurate rings, having isocyanate groups (NCO) contents of from about 10 to about 40 weight percent, more preferably from about 20 to about 35 weight percent, can also be used. These include, for example, polyisocyanates based on 4,4'-, 2,4'- and/or 2,2'-diphenylmethane diisocyanate and the corresponding isomeric mixtures, 2,4- and/or 2,6-toluenediisocyanate and the corresponding isomeric mixtures; mixtures of diphenylmethane diisocyanates and PMDI and mixtures of toluenediisocyanates and PMDI and/or diphenylmethane diisocyanates.

Suitable prepolymers for use as the polyisocyanate component of the formulations of the present invention are prepolymers having NCO contents of from about 2 to about 40 weight percent, more preferably from about 4 to about 30 weight percent. These prepolymers are prepared by reaction of the di- and/or poly-isocyanates with materials including lower molecular weight diols, triols, but also they can be prepared with multivalent active hydrogen compounds such as di- and tri-amines and di- and tri-thiols. Individual examples are aromatic polyisocyanates containing urethane groups, preferably having NCO contents of from about 5 to about 40 weight percent, more preferably about 20 to about 35 weight percent, obtained by reaction of diisocyanates and/or polyisocyanates with, for example, lower molecular weight diols, triols, oxyalkylene glycols, dioxyalkylene glycols or polyoxyalkylene glycols having molecular weights up to about 800. These polyols can be employed individually or in mixtures as di- and/or polyoxyalkylene glycols. For example, diethylene glycols, dipropylene glycols, polyoxyethylene glycols, ethylene glycols, propylene glycols, butylene glycols, polyoxypropylene glycols and polyoxypropylenepolyoxyethylene glycols can be used. Polyester polyols can also be used as well as alkyl diols such as butane diol. Other diols also useful include bishydroxyethyl- or bishydroxypropyl-bisphenol A, cyclohexane dimethanol, and even bishydroxyethyl hydroquinone.

Useful as the polyisocyanate component of the prepolymer formulations of the present invention are: (i) polyisocyanates having an NCO content of from 8 to 40 weight percent containing carbodiimide groups and/or urethane groups, from 4,4'-diphenylmethane diisocyanate or a mixture of 4,4'- and 2,4'-diphenylmethane diisocyanates; (ii) prepolymers containing NCO groups, having an NCO content of from about 2 to about 35 weight percent, based on the weight of the prepolymer, prepared by the reaction of polyols, having a functionality of preferably from 1.75 to 4 and a molecular weight of from about 800 to about 15,000 with 4,4'-diphenylmethane diisocyanate or with a mixture of 4,4'- and 2,4'-diphenylmethane diisocyanates and mixtures of (i) and (ii); and (iii) 2,4- and 2,6-toluene-diisocyanate and the corresponding isomeric mixtures.

PMDI in any of its forms is the most preferred polyisocyanate for use with the present invention. When used, it preferably has an equivalent weight between about 125 and about 300, more preferably from about 130 to about 175, and an average functionality of greater than about 1.5. More preferred is an average functionality of from about 1.75 to about 3.5. The viscosity of the polyisocyanate component is preferably from about 25 to about 5,000 centipoise (cPs) (0.025 to about 5 Pa*s), but values from about 100 to about 1,000 cPs at 25° C. (0.1 to 1 Pa*s) are preferred for ease of processing. Similar viscosities are preferred where alternative polyisocyanate components are selected. Still, preferably, the polyisocyanate component of the formulations of the present invention is selected from the group consisting of MDI, PMDI, an MDI prepolymer, a PMDI prepolymer, a modified MDI and mixtures thereof.

In addition to the ultra low viscosity polyols of the present invention, minor amounts of other polyols and other active hydrogen containing materials can be included in formulations useful for making the foams of the present invention. Active hydrogen containing compounds most commonly used in polyurethane production are those compounds having at least two hydroxyl groups. Those compounds are referred to herein as polyols. Representatives of suitable polyols are generally known and are described in such publications as High Polymers, Vol. XVI, "Polyurethanes, Chemistry and Technology" by Saunders and Frisch, Interscience Publishers, New York, Vol. I, pp. 32–42, 44–54 (1962) and Vol. II, pp. 5–6, 198–199 (1964); Organic Polymer Chemistry by K. J. Saunders, Chapman and Hall, London, pp. 323–325 (1973); and Developments in Polyurethanes, Vol. I, J. M. Burst, ed., Applied Science Publishers, pp. 1–76 (1978).

However, any active hydrogen containing compound can be used with the present invention. Examples of such materials include those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. Preferred herein as alkylene oxide adducts of polyhydroxyalkanes are the ethylene and propylene oxide adducts of di- and tri-hydroxyalkanes. Other useful adducts include ethylene diamine, glycerin, ammonia, 1,2,3,4-tetrahydroxy butane, fructose, and sucrose.

Polyamines, amine-terminated polyols, polymercaptans and other isocyanate-reactive compounds are also suitable in the present invention. Polyisocyanate polyaddition active hydrogen containing compounds (PIPA) can be used with the present invention. PIPA compounds are typically the reaction products of TDI and triethanolamine. A method for preparing PIPA compounds can be found in, for example, U.S. Pat. No. 4,374,209, issued to Rowlands.

Another class of polyols which can be included in minor amounts with the present invention are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyro-nitrile; copolymer polyol stabilizers; and chain transfer agents such as isopropanol.

Polyester polyols can also be used, preferably in minor amounts, with the present invention. For example, polyester polyols derived from the recycling of polyethylene terephthalate can be used. Conventional polyester polyols can also be used. The polyester polyol component in its broadest scope can be any polyester polyol. Preferably, the polyol has a molecular weight from about 400 to about 10,000 and a hydroxyl functionality of from about 2 to about 6. Most preferably, the molecular weight falls within the range of about 1000 to about 6000 and a hydroxyl functionality of from about 2 to about 4.

Typical polyester polyols include, e.g. reaction products of polyhydric (preferably dihydric) alcohols, optionally with the addition of trihydric alcohols, and polybasic carboxylic acids. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic, and/or heterocyclic and they may be substituted, e.g. by halogen atoms, and/or may be unsaturated. Exemplary compounds include succinic acid, adipic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, glutaric acid anhydride, maleic acid, maleic acid anhydride, dimeric and trimeric fatty acids such as oleic acid. Exemplary polyhydric alcohols include ethylene glycol, butylene glycol, hexanediol, octanediol, neopentyl glycol, cyclohexane dimethanol, 2-methyl-1,3-propanediol, glycerol, trimethylolpropane, hexanetriol, butanetriol, trimethylolethane, pentaerythritol, mannitol, sorbitol, methyl glycoside, diethylene glycol, triethylene glycol, dipropylene glycol, polypropylene glycol, dibutylene glycol, polybutylene glycols, and the like. Polyesters of lactones may also be used.

The polyurethane foams of the present invention are advantageously prepared using additives such as surfactants, catalysts, flame retardants, fillers, and the like. For example, amine catalysts can be used with the formulations of the present invention. Any organic compound containing at least one tertiary nitrogen atom and which is capable of catalyzing the hydroxyl/isocyanate reaction can be used in the present blends. Typical classes of amines include the N-alkylmorpholines, N-alkylalkanolamines, N,N-dialkylcyclohexylamines, and alkylamines where the alkyl groups are methyl, ethyl, propyl, butyl, and the like and isomeric forms thereof; and heterocyclic amines. Typical but not limiting thereof are triethylenediamine, tetramethylethylenediamine, bis(2-dimethylaminoethyl) ether, triethylamine, tripropylamine, tributylamine, triamylamine, pyridine, quinoline, dimethylpiperazine, piperazine, N,N-dimethylcyclohexylamine, N-ethylmorpholine, 2-methylpiperazine, N,N-dimethylethanolamine, tetramethylpropanediamine, methyltriethylenediamine, 2,4,6- tri(dimethylaminomethyl) phenol, N,N'N"-tris(dimethylaminopropyl)-sym-hexahydrotriazine, and the like, and mixtures thereof. A preferred group of tertiary amines comprises bis(2-dimethylaminoethyl)ether, dimethylcyclohexylamine, N,N-dimethylethanolamine, triethylenediamine, triethylamine, 2,4,6-tri(dimethylaminomethyl)phenol, N,N',N"-tris (dimethylaminopropyl)sym-hexahydrotriazine, N-ethylmorpholine, and mixtures thereof.

Non-amine catalyst can also be used with the present invention. Typical of such catalysts are organometallic compounds of bismuth, lead, tin, titanium, iron, antimony, uranium, cadmium, cobalt, thorium, aluminum, mercury, zinc, nickel, cerium, molybdenum, vanadium, copper, manganese, zirconium, and the like. Included as illustrative examples are bismuth nitrate, lead 2-ethylhexoate, lead benzoate, ferric chloride, antimony trichloride, antimony glycolate: a preferred organo-tin class includes the stannous salts of carboxylic acids such as stannous acetate, stannous octoate, stannous 2-ethylhexoate, stannous laurate, and the like, as well as the dialkyl tin salts of carboxylic acids such as dibutyl tin diacetate, dibutyl tin dilaurate, dibutyl tin dimaleate, dioctyl tin diacetate, and the like.

One or more trimerization catalysts can be used with the present invention. The trimerization catalyst employed can be any catalyst known to those skilled in the art which will catalyze the trimerization of an organic isocyanate compound to form the isocyanurate moiety. For typical isocyanate trimerization catalysts see The Journal of Cellular Plastics, November/December 1975, page 329: U.S. Pat. Nos. 3,745,133, 3,896,052, 3,899,443, 3,903,018, 3,954,684, and 4,101,465, the disclosures of these patent references being hereby incorporated by reference herein. Typical trimerization catalysts include the glycine salts and tertiary amine trimerization catalysts and alkali metal carboxylic acid salts and mixtures of the various types of catalysts. Preferred species within the classes are sodium N-(2-hydroxy-5-nonylphenyl)methyl-N-methylglycinate, and N,N-dimethylcyclohexylamine, and mixtures thereof. Also included in the preferred catalyst components are the epoxides disclosed in U.S. Pat. No. 3,745,133.

Other additives useful with the present invention can include one or more flame retardants such as tris(2-chloroethyl)phosphate, tris(2-chloropropyl)phosphate, tris (2,3-dibromopropyl)phosphate, tris(1,3-dichloropropyl) phosphate, diammonium phosphate, various halogenated aromatic compounds, antimony oxide, alumina trihydrate, polyvinyl chloride, and the like, and mixtures thereof. Dispersing agents, cell stabilizers, and surfactants can also be incorporated into the formulations of the present invention. Surfactants, including organic surfactants and silicone oils, are added to serve as cell stabilizers. Some representative materials are sold under the names of SF-1109, L-520, L-521 and DC-193 which are, generally, polysiloxane polyoxyalkylene blocked co-polymers, such as those disclosed in U.S. Pat. Nos. 2,834,748; 2,917,480; and 2,846,458, for example. Other additives such as carbon black, colorants, and the like can be added. The addition of fillers such as barium sulfate may be used in the foams of the present invention.

The following examples are provided to illustrate the present invention. The examples are not intended to limit the scope of the present invention and should not be so interpreted. Amounts are in weight parts or weight percentages unless otherwise indicated.

EXAMPLES

Example 1

Preparation of Polyol I takes place in a twenty gallon reactor and proceeds according to the following steps:
1) 10.18 lb. (4.62 kg) of a 90 percent solution of phenol in water at ambient temperature is added to the reactor;
2) 24.08 lb. (10.92 kg) of an 85 percent solution of diethanolamine in water at ambient temperature is added to the phenol and the admixture is heated to 90° C.;
3) 11.85 lb. (5.38 kg) of 37 percent formaldehyde in water (formalin37) is added to the reactor at 90° C. and at a rate of about 0.371 lb/min (0.17 kg/min);
4) the reaction mixture is held at 90° C. for 2 hours;
5) water is striped from the reactor admixture at 100° C., with a nitrogen flow rate of 8 scfh (0.227 scmh) until the water concentration is measured to be from 0.75 to 1.00 weight percent water measured by a Karl Fischer method (ASTM: D4672-95);
6) 42.0 lb. (19.05 kg) of mixed oxide feed (80 weight percent propylene oxide/20 weight percent ethylene oxide) is added to the reactor at 90° C. at a rate of 0.3 lb./min (0.14 kg/min)
7) 0.5 lb. (0.23 kg) dimethylethanolamine is added to the reactor at 95° C.;
8) 28.22 additional lb. (12.80 kg)of mixed oxide feed is added to the reactor at 95° C. and at a rate of 0.3 lb./min (0.14 kg/min); and
9) the reactants are held at a temperature of 95° C. until a percent hydroxyl (phthalic anhydride wet method) of 9.70% is reached.
10) residual unreacted propylene oxide and ethylene oxide are stripped from the reaction mixture at 100° C., with a nitrogen flow rate of 8 scfh (0.227 scmh) until the oxide concentration is less than 500 ppm measured by gas chromatograph;

The resultant polyol has an OH number of 320, a viscosity of 802 cps (0.8 Pa*s) at 25° C. and is designated as Polyol I.

Example 2

Preparation of Polyol II takes place in a twenty gallon reactor and proceeds according to the following steps:
1) 9.55 lb. (4.33 kg) of a 90 percent solution of phenol in water at ambient temperature is added to the reactor;
2) 22.59 lb. (10.25 kg) of an 85 percent solution of diethanolamine in water at ambient temperature is added to the phenol and the admixture is heated to 90° C.;
3) 11.12 lb. (5.04 kg) of formalin37 is added to the reactor at 90° C. and at a rate of about 0.371 lb/min (0.17 kg/min);
4) the reaction mixture is held at 90° C. for 2 hours;
5) water is stripped from the reactor admixture at 100° C., with a nitrogen flow rate of 8 scfh (0.23 scmh) until the water concentration is measured to be from 0.75 to 1.00 weight percent water;
6) 43.0 lb. (19.5 kg) of mixed oxide feed (80 weight percent propylene oxide/20 weight percent ethylene oxide) is added to the reactor at 90° C. at a rate of 0.3 lb./min (0.14 kg/min);
7) 0.5 lb. (0.23 kg) dimethylethanolamine is added to the reactor at 95° C.;
8) 29.0 additional lb. (13.15 kg)of mixed oxide feed is added to the reactor at 95° C. and at a rate of 0.3 lb./min (0.14 kg/min); and
9) the reactants are held at a temperature of 95° C. until a weight percent OH (phthalic anhydride wet method) of 9.09% is reached.
10) residual unreacted propylene oxide and ethylene oxide are stripped from the reaction mixture at 100° C., with a nitrogen flow rate of 8 scfh (0.227 scmh) until the oxide concentration is less than 500 ppm measured by gas chromatograph;

The resultant polyol has an OH number of 300, a viscosity of 570 cps (0.57 Pa*s) at 25° C. and is designated as Polyol II.

Example 3

Preparation of Polyol III takes place in a twenty gallon reactor and proceeds according to the following steps:
1) 10.30 lb. (4.67 kg) of a 90 percent solution of phenol in water at ambient temperature is added to the reactor;
2) 24.37 lb. (11.05 kg) of an 85 percent solution of diethanolamine in water at ambient temperature is added to the phenol and the admixture is heated to 90° C.;
3) 15.99 lb. (7.25 kg) of formalin37 is added to the reactor at 90° C. and at a rate of about 0.37 lb/min (0.17 kg/min);
4) the reaction mixture is held at 90° C. for 2 hours;
5) water is stripped from the reactor admixture at 100° C., with a nitrogen flow rate of 8 scfh (0.23 scmh) until the water concentration is measured to be from 0.75 to 1.00 weight percent water;

6) 41.2 lb. (18.7 kg) of mixed oxide feed (80 weight percent propylene oxide/20 weight percent ethylene oxide) is added to the reactor at 90° C. at a rate of 0.3 lb./min (0.14 kg/min);
7) 0.50 lb. (0.23 kg) dimethylethanolamine is added to the reactor at 95° C.;
8) 27.4 additional lb. (12.4 kg)of mixed oxide feed is added to the reactor at 95° C. and at a rate of 0.3 lb./min (0.14 kg/min); and
9) the reactants are held at a temperature of 95° C. until a weight percent OH (phthalic anhydride wet method) of 9.17% is reached.
10) residual unreacted propylene oxide and ethylene oxide are stripped from the reaction mixture at 100° C., with a nitrogen flow rate of 8 scfh (0.227 scmh) until the oxide concentration is less than 500 ppm measured by gas chromatograph;

The resultant polyol has an OH number of 303, a viscosity of 1240 cps (1.24 Pa*s) at 25° C. and is designated as Polyol III.

Example 4

Polyol blends containing Mannich polyols and polymeric MDI are mixed and sprayed using a Gusmer H-2000* spray foam machine equipped with a Gusmer GX-7* spray gun. (*Gusmer H-2000 and Gusmer GX-7 are trade designations of Gusmer Machinery Group, Inc.). Operating pressures are typically 1000–1200 psi with a total throughput of 7–15 lb./min (3.2–6.8 kg/min). Foam formulations are displayed in Table 1. Foam physical properties are displayed in Table 2.

TABLE 1

Formulations

| Component | Formulation A | Formulation B | Formulation C |
|---|---|---|---|
| Polyol I | 42.30 | | |
| Polyol II | | 42.02 | |
| Polyol III | | | 42.16 |
| VORANOL[1] 800 (Amine Initiated Polyether Polyol) | 7.05 | 7.00 | 7.03 |
| TERATE 2541L[2] (Aromatic Polyester Polyol) | 19.03 | 18.91 | 18.97 |
| GLYCERINE | 2.11 | 2.10 | 2.11 |
| SAYTEX RB-79[3] (Tetrabrominated Phthalate Ester) | 14.10 | 14.01 | 14.05 |
| FYROL PCF[4] (Tris(2-chloropropyl) Phosphate) | 7.05 | 7.00 | 7.03 |
| POLYCAT 5[5] (Pentamethyl-diethylene Triamine) | 0.70 | 0.70 | 0.70 |
| POLYCAT 8[5] (N,N-Dimethyl Cyclohexylamine) | 0.35 | 0.70 | 0.35 |
| NIAX A-33[6] (33% Triethylene Diamine in Dipropylene Glycol) | 0.35 | 0.70 | 0.35 |
| HEXCEM 977[7] (Potassium 2-ethylhexanoate) | 1.06 | | 1.05 |
| DABCO K-15[8] (70% Potassium Octoate in Diethylene Glycol) | | 0.70 | |
| 24% Lead Octoate in Water | 0.07 | 0.07 | 0.07 |
| Dabco LK-443[8] (Silicone Surfactant) | 1.41 | 1.72 | 1.73 |

TABLE 1-continued

Formulations

| Component | Formulation A | Formulation B | Formulation C |
|---|---|---|---|
| Water | 4.41 | 4.38 | 4.40 |
| PAPI[1] 27 Index (Polymeric MDI) | 1.54 | 1.50 | 1.50 |

[1]Trademark and/or trade designation of The Dow Chemical Company
[2]Trademark and/or trade designation of KOSA
[3]Trademark and/or trade designation of Albermarle
[4]Trademark and/or trade designation of Akzo Chemical
[5]Trademark and/or trade designation of Air Products
[6]Trademark and/or trade designation of OSi-Witco
[7]Trademark and/or trade designation of OMG Americas
[8]Trademark and/or trade designation of Air Products

TABLE 2

Foam Physical Properties

| | Formulation A | Formulation B | Formulation C |
|---|---|---|---|
| Density | | | |
| lb./ft³ | 2.86 | 2.24 | 2.82 |
| kg/m³ | 45.81 | 35.88 | 45.11 |
| Compressive Strength; ASTM-1621 | | | |
| Perpendicular (psi) | 35.60 | 22.57 | 41.65 |
| (kPa) | 245.55 | 155.61 | 287.09 |
| Parallel (psi) | 41.89 | 36.36 | 53.75 |
| (kPa) | 288.81 | 252.54 | 370.40 |
| Closed Cell Content (%); ASTM D-2856 | | | |
| | 92.56 | 93.82 | 95.88 |
| Dimensional stability, % Volume Change After 14 Days; ASTM-2126 | | | |
| 100% R.H. at 158° F. (70° C.) | −0.19 | −2.31 | −2.21 |
| Dry heat 200° F. (93° C.) | — | — | −3.02 |
| Freeze −22° F. (−30° C.) | — | — | −0.48 |
| Tunnel Burn Test; ASTM E84-98 | | | |
| Flame Spread | 40 | — | 35 |
| Smoke | 790 | — | 790 |
| UL-790 Burn Test; ASTM E108-98 | | | |
| Intermittent Flame Class B | — | — | Pass |
| Burning Brand Class B | — | — | Pass |

What is claimed is:

1. A process for preparing a Mannich polyol having a viscosity of from 300 to 3,500 cps (0.3 to 3.5 Pa*s) at 25° comprising the steps of admixing a phenol, an alkanolamine, and formaldehyde at a molar ratio of 1:1:1 to 1:2.2:2.2 to prepare a Mannich base and then alkoxylating the Mannich base with an admixture of ethylene oxide and propylene oxide under reaction conditions sufficient to prepare a Mannich polyol wherein the minimum amount of alkylene oxide used is 0.3 moles per hydroxyl group in the Mannich base, about 5 to 55 percent of the weight of the ethylene oxide and propylene oxide is ethylene oxide and the Mannich polyol has an OH number of from 250 to 350.

2. The process of claim 1 wherein the alkanolamine is diethanolamine.

3. The process of claim 1 having the additional step of stripping water from the Mannich base prior to alkoxylation.

4. The process of claim 1 wherein the admixture of ethylene oxide and propylene oxide is at least 50 weigh percent of the total alkylene oxides used.

5. The process of claim 4 wherein of the combined weight of ethylene oxide and propylene oxide, from about 10 to about 45 percent of that weight is ethylene oxide.

6. The process of claim 4 wherein of the combined weight of ethylene oxide and propylene oxide, from about 15 to about 30 percent of that weight is ethylene oxide.

7. The process of claim 4 wherein of the combined weight of ethylene oxide and propylene oxide, 20 percent of that weight is ethylene oxide.

8. The process of claim 1 wherein the maximum amount of alkylene oxides used is 3.5 moles per hydroxyl group in the Mannich base.

9. The process of claim 1 wherein a supplemental catalysts is used to prepare a polyol a Mannich polyol having an OH number of from 250 to 350.

10. A Mannich polyol having a viscosity of from 300 to 3,500 cps (o.3 to 3.5 Pa*s) at 25° C. and an OH number of about 250 to 500.

11. The Mannich polyol of claim 10 wherein the Mannich polyol has a viscosity of from 300 to 1500 cps (0.3 to 1.5 Pa*s).

12. The Mannich polyol of claim 11 wherein the Mannich polyol has a viscosity of from 300 to 1000 cps (0.3 to 1.0 Pa*s).

13. The Mannich polyol of claim 12 wherein the Mannich polyol has an OH number of from about 280 to about 450.

14. The Mannich polyol of claim 12 wherein the Mannich polyol has an OH number of from about 300 to about 400.

* * * * *